United States Patent
Odhner

(10) Patent No.: US 8,256,910 B2
(45) Date of Patent: Sep. 4, 2012

(54) LIGHTWEIGHT AEROGEL-BASED OPTICAL ELEMENTS

(75) Inventor: Jefferson E. Odhner, Amherst, NH (US)

(73) Assignee: Optics 1, Inc, Westlake Village, CA (US)

( * ) Notice: Subject to any disclaimer, the term of this patent is extended or adjusted under 35 U.S.C. 154(b) by 314 days.

(21) Appl. No.: 12/587,195

(22) Filed: Oct. 2, 2009

(65) Prior Publication Data

US 2011/0080666 A1     Apr. 7, 2011

(51) Int. Cl.
   *G02B 5/26* (2006.01)
(52) U.S. Cl. .......................................... 359/839
(58) Field of Classification Search .................. 359/838, 359/839, 883
   See application file for complete search history.

(56) References Cited

U.S. PATENT DOCUMENTS

| | | |
|---|---|---|
| 2,249,767 A | 7/1941 | Kistler |
| 2,589,705 A | 3/1952 | Kistler |
| 4,150,101 A | 4/1979 | Schmidt et al. |
| 4,402,927 A | 9/1983 | Von Dardel et al. |
| 5,358,776 A | 10/1994 | Hotaling |
| 5,569,058 A * | 10/1996 | Gnade et al. ............... 445/24 |
| 6,197,270 B1 | 3/2001 | Sonoda et al. |
| 6,858,983 B2 * | 2/2005 | Mochizuki et al. ......... 349/67 |
| 7,384,988 B2 | 6/2008 | Gauthier et al. |

OTHER PUBLICATIONS

Johnson et al., "Rapid Fabrication of Lightweight Silicon Carbide Mirrors," Proc. SPIE vol. 4771 (2002) pp. 243-253.
Harnish et al., "Ultra-Lightweight C/SIC Mirros and Structures," ESA Bulletin 95, Aug. 1998 PP.
Hotaling,"Ultra-Low Density Aerogel Optical Applications," J. Mater. Res. Vol. 8, No. 2, Feb. 1993 pp. 352-355.

* cited by examiner

*Primary Examiner* — Euncha Cherry
(74) *Attorney, Agent, or Firm* — Opticus IP Law PLLC

(57) ABSTRACT

Aerogel-based optical elements are disclosed. The aerogel-based optical elements have an aerogel member having at least one surface, and at least one optical surface disposed on the at least one aerogel member surface. The at least one optical surface comprises an electroformed metal or at least one glass sheet. The at least one optical surface can be transmissive, reflective, or both. Different types of aerogel-based optical elements are presented, along with various methods of making the aerogel-based optical elements.

20 Claims, 9 Drawing Sheets

LIGHTWEIGHT AEROGEL-BASED OPTICAL ELEMENTS

FIELD OF THE INVENTION

The present invention relates generally to optical elements, and in particular to lightweight aerogel-based optical elements and methods of making the lightweight aerogel-based optical elements.

BACKGROUND ART

Lightweight optical elements are important for optical systems that need to be lightweight, such as the imaging systems used in unmanned aerial vehicles (UAVs) and space-based optical systems such as used in spaced-based systems like satellites and unmanned exploration vehicles.

With respect to UAVs, lightweight optical elements are advantageous because they facilitate maximizing flight times for the limited amount of power available, promote better maneuverability, allow for larger apertures and facilitate longer-range viewing (i.e., narrow field of views (FOVs)). Lightweight optical elements also enable movable mirrors having larger apertures and faster movements because the drive motors can be lighter and/or stronger.

With respect to space-based systems, lightweight optical elements are advantageous because of the high cost per weight to launch items into space. Lightweight optical elements also have low inertia, which is important if the space-based system is moving, since less energy is required to get the system moving, keep it moving and bring it to a stop.

Prior art lightweight optical elements rely on either mechanical design or lightweight materials. Mechanical design of lightweight optical elements involves putting ribs in glass, metal or ceramic (ZERODUR, a trademark of Schott AG, Mainz, Germany), or the application of gratings for diffractive optics. Lightweight materials used in the past include low-density materials such as graphite composite materials, foamed aluminum, foamed silicon carbide, and beryllium. ZERODUR has excellent thermal properties, but even when it is ribbed to make the optical element lighter, it is still a relatively dense material (2.53 g/cm$^3$), so that the resulting optical element is still relatively heavy.

Thus, there is a need for even lighter weight optical elements than those currently available.

SUMMARY OF THE INVENTION

An aspect of the invention is an aerogel-based optical element having an aerogel member having at least one surface, and at least one optical surface disposed on the at least one aerogel member surface. The at least one optical surface comprises an electroformed metal or at least one glass sheet. The at least one optical surface can be transmissive, reflective, or both (i.e., partially transmissive, partially reflective).

Another aspect of the invention is a method of forming an optical element. The method includes providing an aerogel member having at least one surface, and disposing at least one glass sheet or at least one metal layer on the at least one surface.

Additional features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF INVENTION

The present invention is directed generally to optical elements and in particular is directed to lightweight aerogel-based optical elements. Aspects of the invention include methods of making the aerogel-based optical elements. The lightweight aerogel-based optical elements contemplated herein include but is not limited to flat mirrors, curved mirrors, windows, beam splitters and the like.

Aerogel is a solid-state substance similar to a gel, but with the liquid component of the gel replaced with a gas. The resulting solid has an extremely fine and highly porous structure. Example aerogels are about 99.8% air and thus have a density about a thousand times less than glass. Aerogels can be made of various materials such as silicon, alumina, titania, hafnium carbide and a variety of polymers. Aerogels are remarkably strong, have excellent electrical and thermal insulation properties, and have excellent sound and shock absorption characteristics. Aerogels have a hardness that makes them amenable to optical figuring techniques such as diamond turning. Example aerogels and methods of manufacturing different types of aerogels are disclosed, for example, in U.S. Pat. Nos. 2,249,769; 4,150,101; 4,402,927; 6,197,270; and 7,384,988, which patents are incorporated by reference herein.

Table 1 below is a list of various materials used to make lightweight optical elements (typically mirrors), along with the material properties.

TABLE 1

EXAMPLE LIGHTWEIGHT MATERIALS

| Material | Density (g/cm³) | CTE (×10⁻⁶/° C.) |
| --- | --- | --- |
| ZERODUR | 2.53 | 0.05 |
| Fused silica | 2.0 | 0.6 |
| Carbon composite | 1.3-1.8 | 1.5 |
| Saphire | 3.98 gr/cc | 3.24-5.66 |
| Foamed silicon carbide | 0.16-0.38 (solid SiC = 3.186) | 2.2 (ERG Duocell) |
| Borosilicate glass | 2.32 | 3.25 |
| Cleartran | 4 | 6.5 |
| Corning Microsheets | 2.53 | 7.38 |
| Berillium | 1.844 | 11.5 |
| Nickel (high phosphorous) | 7.9 (Saturn Industry) | 12-13 |
| Foamed Aluminum (ERG Duocell) | 0.08-0.3 (solid Al = 2.7) | 23.6 |
| Pelicle (nitrocellulose) | 1.2 | 4.75 |

Table 2 lists the properties associated with silica-based aerogel.

TABLE 2

AEROGEL PROPERTIES

| Material | Density (g/cm³) | CTE (×10⁻⁶/° C.) |
| --- | --- | --- |
| Aerogel (silica) | 0.024 nominal (Range: 0.002-0.3) | 2.0 |

As can be seen by comparing the material properties of the commonly used lightweight materials listed in Table 1 to the material properties of aerogel listed in Table 2, it is clear that aerogel is far lighter than all of the commonly used mirror materials.

Sandwich Method

Figure 1:
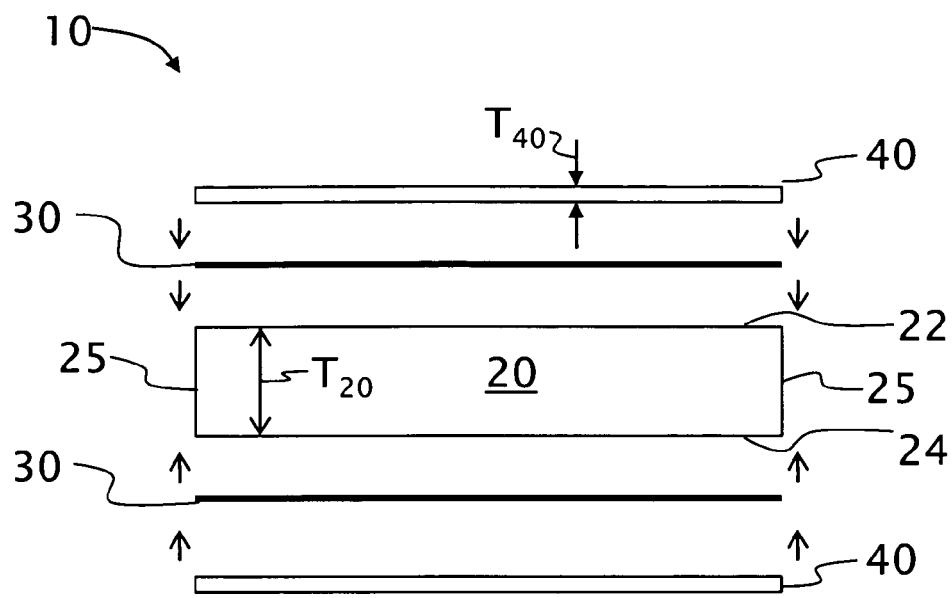
FIG. 1 is an exploded side view of an example planar aerogel-based optical element.
Figure 2A:
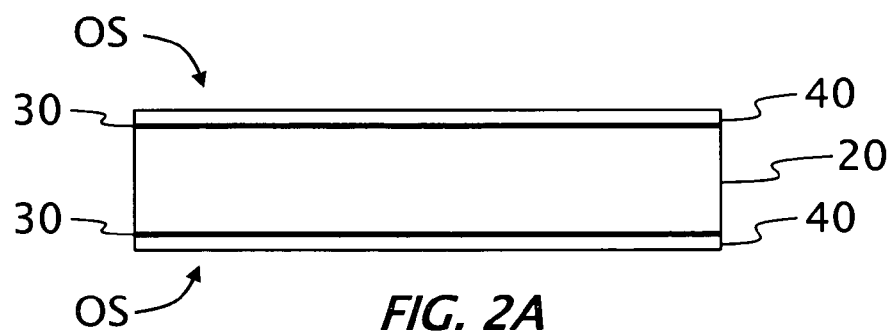
FIG. 2A and FIG. 2B are example aerogel-based optical elements such as shown in FIG. 1, wherein FIG. 2A includes two thin glass sheets and FIG. 2B includes a glass sheet and a non-glass sheet.

FIG. 1 is an exploded side view of an example planar aerogel-based optical element ("element") 10. Element 10 includes an aerogel member 20 having top and bottom surfaces 22 and 24, respectively, and sides 25. A thin layer of fixing material 30, such as an epoxy or adhesive, is disposed on top and bottom surfaces 22 and 24. Thin glass layers 40 are then applied to the respective fixing material layers 30 on the top and bottom surfaces 22 and 24 to form a sandwich structure as shown in FIG. 2A. Thin glass layers 40 define respective optical surfaces OS for element 10.

In an example embodiment, thin glass layers 40 have a thickness T40 in the range 0.05 mm≦T40≦1 mm, or more preferably 0.05 mm≦T40≦0.5 mm. An example glass for thin glass layers 40 is Corning 0211 microsheet or Corning Eagle XG glass, available from Corning, Inc., Corning N.Y. Exemplary thin glass layers 40 are also formed from fused silica. Corning XG glass has a coefficient of thermal expansion (CTE) that is nearly identical to that of the aerogel and thus is an exemplary material for at least one of thin glass layers 40.

The thicknesses $T_{20}$ of aerogel member 20 can vary widely and is generally determined by the particular application for element 10.

In example embodiments, one or both surfaces 22 and 24 of aerogel member 20 are polished to create one or more flat surfaces, or are diamond turned to create one or more curved surfaces. In an example embodiment, one of surfaces 22 and 24 is polished to form a flat surface while the other surface is diamond turned to form a curved surface, which can include a grating-type surface (see e.g., FIGS. 20A and 20B). Aerogel has a high compression strength but a low sheer strength. The addition of thin glass sheets 40 gives element 10 a relatively high sheer strength so that the element is sturdy when subjected to both compression and sheer forces.

Figure 2B:
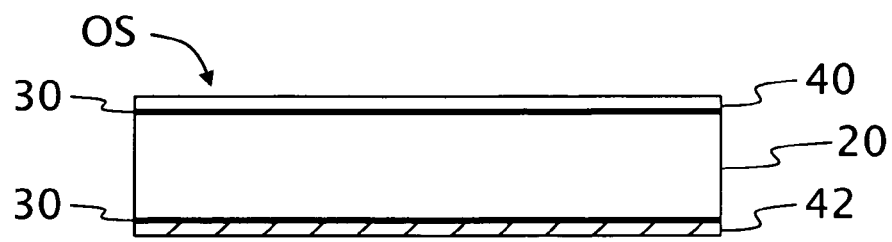

In an example embodiment illustrated in FIG. 2B, only one surface (e.g., top surface 22) includes glass sheet 40 while the other includes a thin, non-glass sheet 42 made of a non-glass material such as ceramic, metal, plastic, etc. In the example embodiments of FIG. 1 and FIGS. 2A and 2B, element 10 includes at least one optical surface OS in the form of glass sheet 40. In the example of FIG. 2B, non-glass sheet 42 may also constitute an optical surface OS, such as a metal reflective surface.

Note that no planarization layer is needed on either of aerogel member surfaces 22 and 24 because the glass layer is applied as a sheet and not as a thin film.

First Electroforming Method

Figure 3:
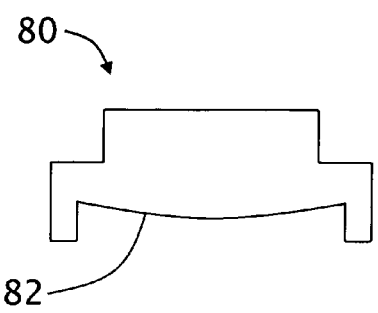
FIG. 3 is a side view of an example mandrel used to form aerogel-based optical elements.

Electroforming is a replication process through which a highly accurate negative replica is produced from a carefully prepared mandrel or master surface. With reference to FIG. 3, a mandrel 80 is diamond turned in aluminum or brass so that it has a surface 82 having the same figure and size as the desired aerogel-based mirror element 10.

Figure 4:
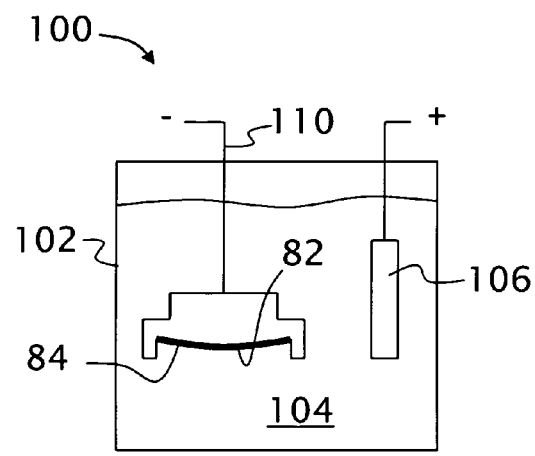
FIG. 4 is a schematic diagram of an electroforming system with the mandrel of FIG. 3 immersed therein, and showing an electroformed mandrel surface.

With reference to FIG. 4, mandrel 80 is arranged in an electroforming apparatus 100 that has a vessel 102 that contains an electroplating solution 104. Electroforming systems such as electroforming system 100 are available from Spectrum Scientific Incorporated, Irvine, Calif., and Optiform, Inc., Temecula, Calif. Electroforming apparatus also has a nickel anode 106 immersed in electroplating solution 104. Mandrel 80 is immersed in electroplating solution 104 and an electrical contact 110 is connected to mandrel 80 to make the mandrel act as a cathode.

Electroforming apparatus 100 is then activated (i.e., an electrical potential is applied across the anode (+) and cathode (−)) to form an electroformed layer 84 of electroless nickel on mandrel surface 82. In an example embodiment layer 84 has a thickness of between about of 2 mils to about 6 mils. Layer 84 typically has a surface figure close to that of mandrel surface 82.

Figure 5:
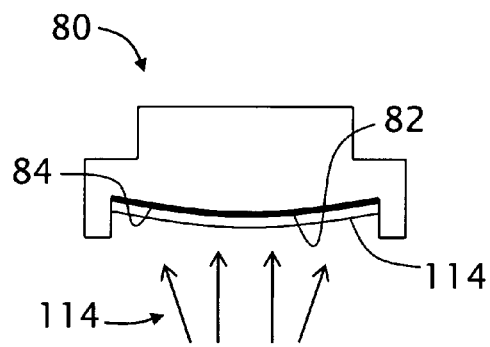
FIG. 5 and FIG. 6 are side views of the mandrel of FIG. 3 with various coatings being applied thereto.
Figure 6:
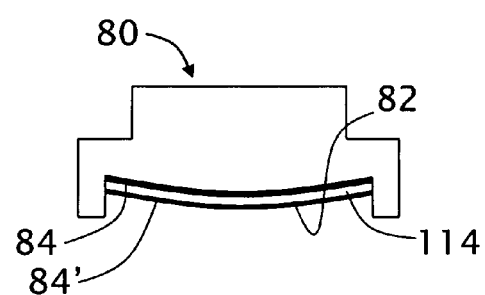

Mandrel 80 is removed from electroforming apparatus 100 and layer 84 is diamond turned so that its surface is closer to the precise mirror figure associated with uncoated mandrel surface 82. With reference to FIG. 5, a mold release material 114 is then applied (e.g., sprayed) on the refigured layer 84. Mandrel 80 is then once again placed in electroforming apparatus 100 and a new nickel layer 84' is deposited atop the mold release material 114 using electroforming apparatus 100 of FIG. 4. The resulting three layers 84, 114 and 84' on mandrel surface 82 are illustrated in FIG. 6.

Figure 7:
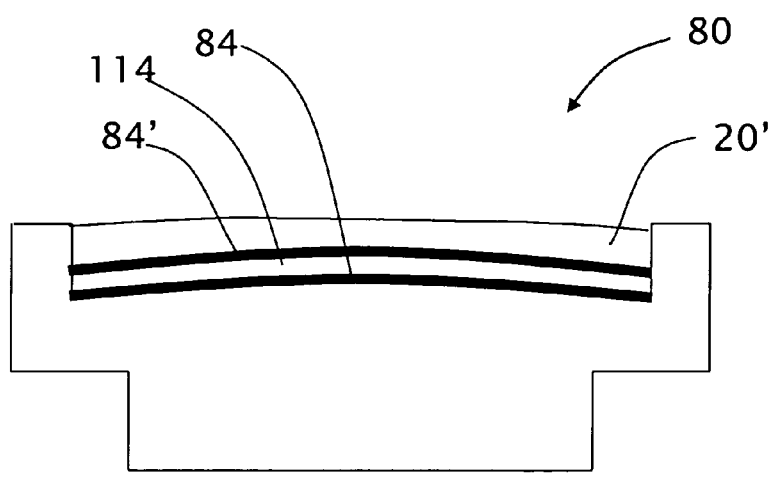
FIG. 7 shows the mandrel of FIG. 6 being filled with an aerogel precursor.
Figure 8:
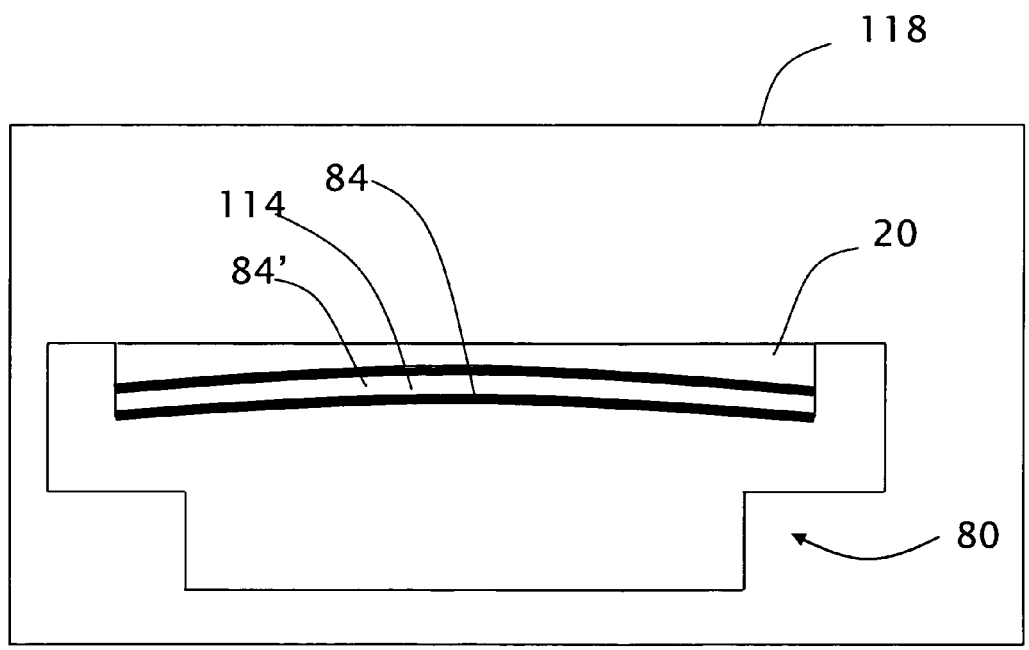
FIG. 8 shows the mandrel of FIG. 7 in an autoclave that converts the aerogel precursor to aerogel.

With reference now to FIG. 7, mandrel 80 is filled with a liquid aerogel material (precursor) 20'. With reference to FIG. 8, aerogel precursor 20' is then processed into aerogel 20, e.g., by processing in situ in an autoclave 118. The resulting aerogel 20 adheres to the second nickel layer 84'.

Figure 9:
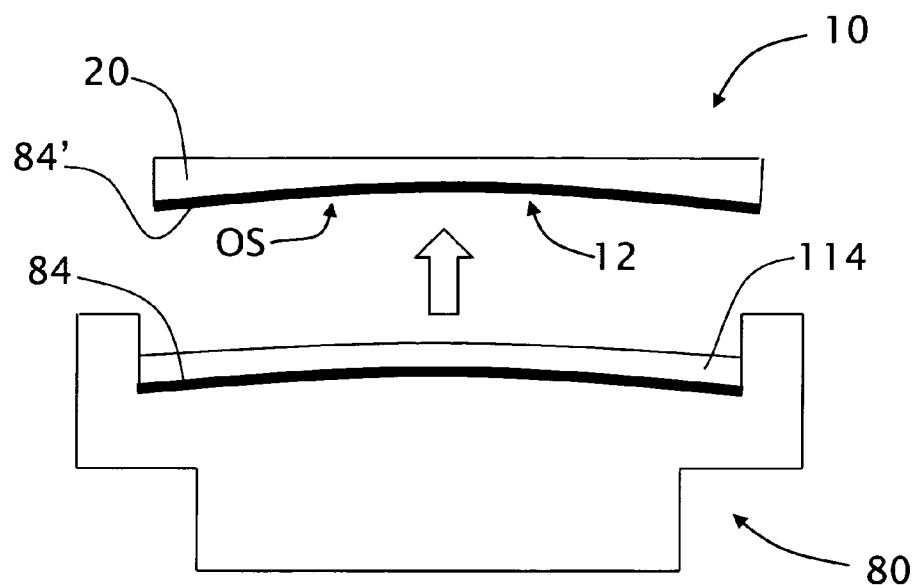
FIG. 9 shows the mandrel of FIG. 8 being separated from the aerogel member and nickel layer at the mold release layer to form the aerogel-based optical element.

With reference to FIG. 9, mandrel 80 is separated from aerogel layer (now aerogel member) 20 and nickel layer 84' at mold release layer 114. The separated structure is an aerogel-based mirror element 10 formed by aerogel 20 and nickel coating 84', which defines the mirror surface 12. Mirror surface 12 has the diamond-turned figure substantially that of mandrel surface 82. Aerogel member 20 serves as a curved substrate that supports and maintains mirror surface 12 with the desired figure, and prevents any drum ringing. A figure performance of better than $\lambda/4$ for mirror surface 12 is achievable using this electroforming approach. In this example embodiment, mirror surface 12 constitutes a reflective optical surface OS for element 10.

Figure 10:
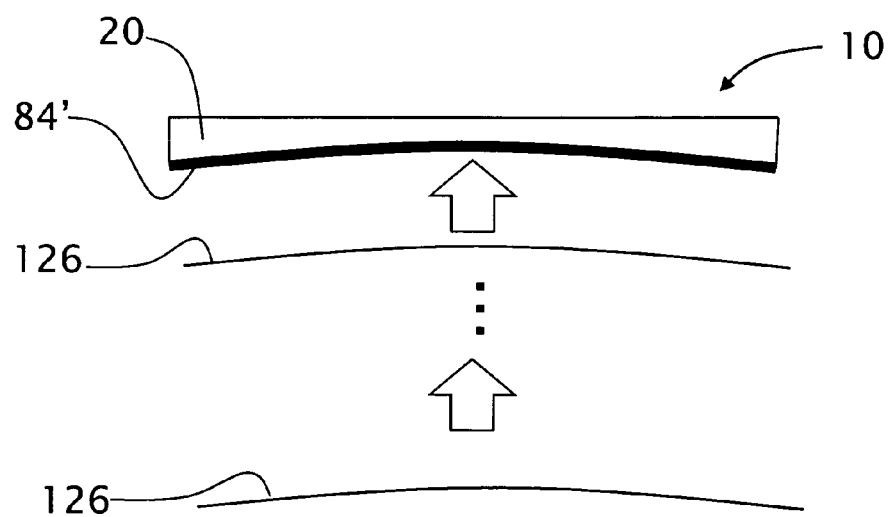
FIG. 10 shows one or more coatings being applied to the mirror surface of the aerogel mirror element of FIG. 9 to enhance the mirror reflectively at desired wavelengths of operation.

In an example embodiment illustrated in FIG. 10, one or more coatings 126 are applied to mirror surface 12 to enhance the mirror reflectively at desired wavelengths of operation. Example coatings 126 include metal coatings, such as Aluminum, silver, gold, etc., and dielectic coatings, such as silicon dioxide, magnesium fluoride, tantalum pentoxide, zinc sulfide, and titanium dioxide. Element 10 is amenable to the standard coating methods such as vapor deposition and ion-beam-assisted (e.g., sputtering) deposition. In this example embodiment, mirror surface 12 plus the one or more coating constitute the reflective optical surface OS for element 10.

Figure 11:
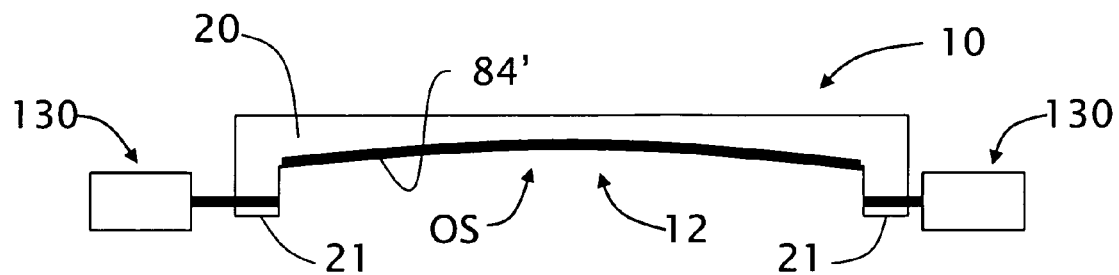
FIG. 11 is a side view of an example mandrel configured so that the resulting aerogel member includes mirror mounting tabs.

In an example embodiment illustrated in FIG. 11, mandrel 80 (FIG. 3) is configured so that aerogel member 20 includes mirror mounting tabs 21 of various shapes, sizes and locations that can be used to mount mirror element 10 into or on a mirror mount 130.

Second Electroforming Method

Figure 12:
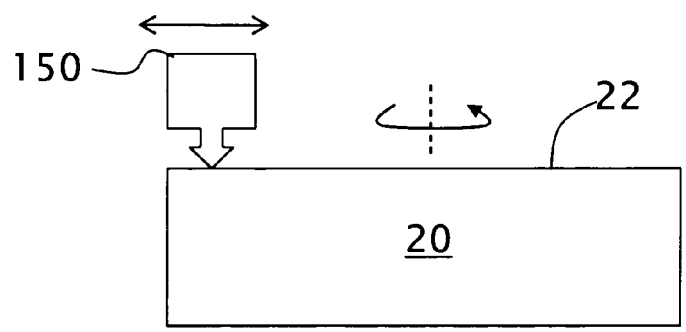
FIG. 12 is a schematic diagram of a hydrophobic aerogel member having a surface in the process of being diamond turned.

FIG. 12 is a schematic diagram of a hydrophobic aerogel member 20 having a surface 22 in the process of being diamond turned. Hydrophobic aerogel member 20 is made using a single chemical step during the standard aerogel formation process (i.e., at the precursor mixing step). The hydrophobic aerogel remains hydrophobic unless and until it is exposed to strong UV light.

Figure 13:
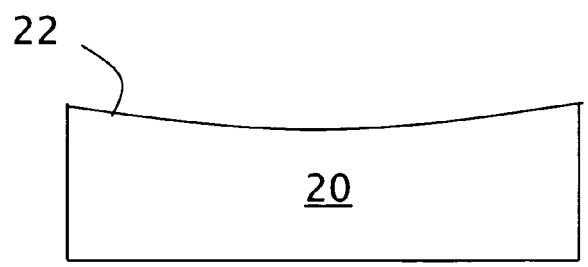
FIG. 13 is a schematic diagram of the diamond-turned aerogel member of FIG. 12.

With reference to FIG. 13, surface 22 of hydrophobic aerogel member 20 is figured, e.g., via a diamond turning using a diamond turning tool 150 shown in FIG. 12, so that the surface has a desired figure such as the concave shape shown.

Figure 14A:
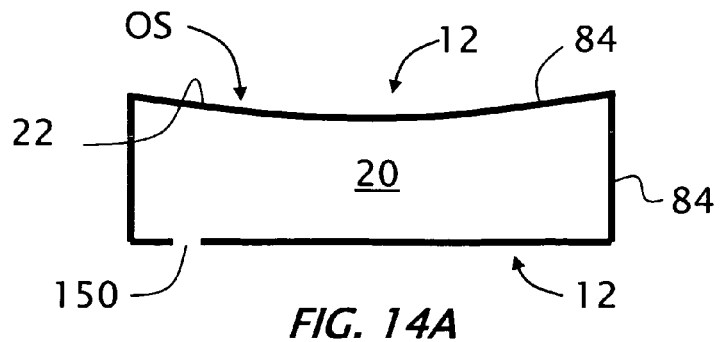
FIG. 14A shows the diamond-turned aerogel member of FIG. 13 coated with a layer of electroless nickel.

With reference now to FIG. 14A, in an example embodiment the diamond-turned aerogel member 20 is coated with a layer 84 of electroless nickel (e.g., using the aforementioned electroforming apparatus 100 of FIG. 4). In an example embodiment, nickel layer 84 is only a few mils thick. The coated aerogel member 10 is then placed back in diamond turning tool 150 and nickel layer 84 is directly diamond turned to obtain the desired surface figure. In an example embodiment, nickel layer 84 is between 150 microns and 2 mm thick. Also in an example embodiment, an air hole 150 is provided in nickel layer 84 so that element 10 can more readily equilibrate with the environment in which it is placed.

Figure 14B:
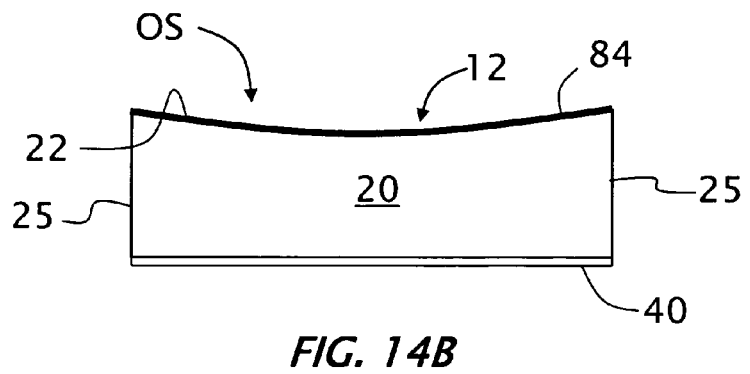
FIG. 14B is similar to FIG. 14A and illustrates an example embodiment wherein only a portion of the aerogel member is coated with an electroless nickel layer.

FIG. 14B is similar to FIG. 14A and illustrates an example embodiment wherein only a portion of aerogel member 20 is coated with electroless nickel layer 84. In an example embodiment, the portion of aerogel member 20 that is so coated is aerogel member surface 22. In an example embodiment, at least some of the remaining portions of aerogel member 20, such as bottom surface 24 and sides 25, are coated or are otherwise provided with a material other than nickel layer 84. For example, bottom surface 24 is shown in FIG. 14B as having a thin glass sheet 40 attached thereto, while sides 25 remain bare. In this particular example embodiment, electroless nickel layer 84 constitutes the reflective optical surface OS for element 10.

Replication Process

Figure 15:
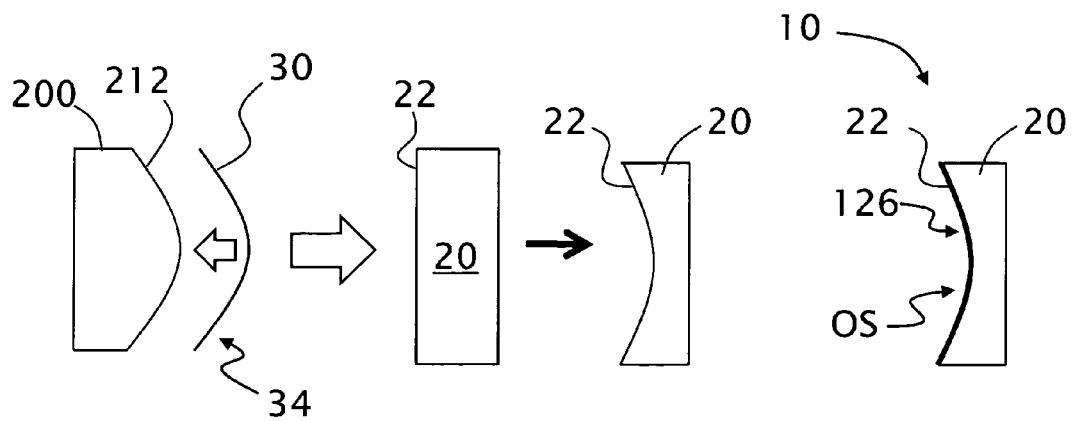
FIG. 15 is a schematic diagram illustrating an example sequence of the replication process used to form an aerogel-based optical element.

In another example method of forming element 10, a desired surface figure (including a planar figure) is applied to aerogel member surface 22 using a replication process. FIG. 15 is a schematic diagram illustrating an example sequence of the replication process. A negative master optic 200 with a figured surface 212 is provided with a thin layer 34 of fixing material 30, such as epoxy. The negative master optic is then applied (i.e., impressed) to aerogel member surface 22 so that the member surface takes on the shape of master optic surface 212. The resultant aerogel shaped aerogel member surface 22 is then coated with a one or more coatings 126 as discussed above. The resulting aerogel-based mirror element 10 is stable over extreme temperature ranges and the figure of surface 22 can be formed to and maintained to $\lambda/10$ or better.

An advantage of the invention is that it allows for the manufacturing of mirrors, beam splitters and windows (operating up to about $\lambda=5$ μm for transmission) and other types of optical elements that are lighter than anything currently available, often by orders of magnitude. The low sheer strength of aerogel is overcome by either sandwiching a high strength material such as glass layers on top and bottom surfaces, through the use of a "fiber optic rebar" mesh, or by electroforming or otherwise coating the entire (or substantially the entire) element.

Note again that none of methods require the use of a planarization layer.

Other Example Aerogel-Based Optical Elements

Figure 16:
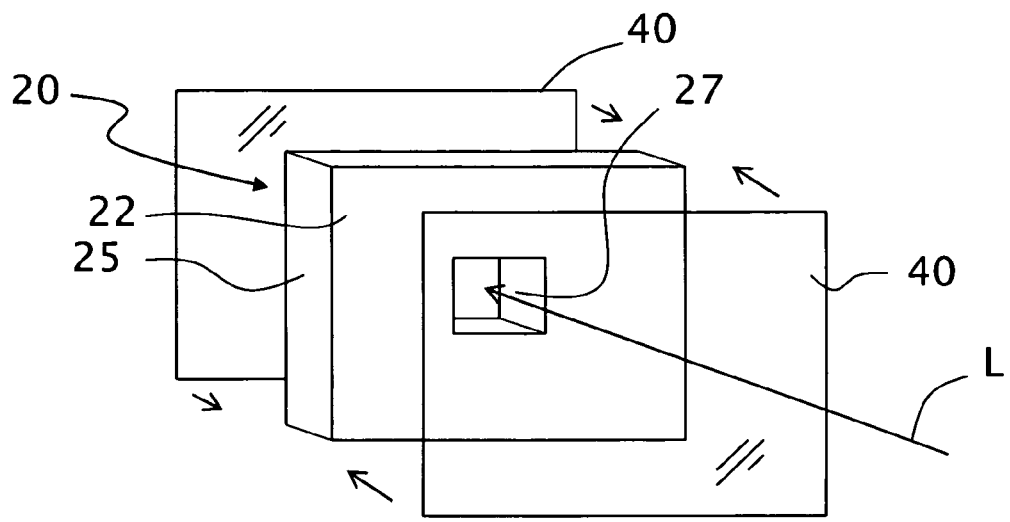
FIG. 16 is an exploded perspective view of an example aerogel-based optical element wherein aerogel member includes an aperture and glass sheets on the respective opposing sides.
Figure 17:
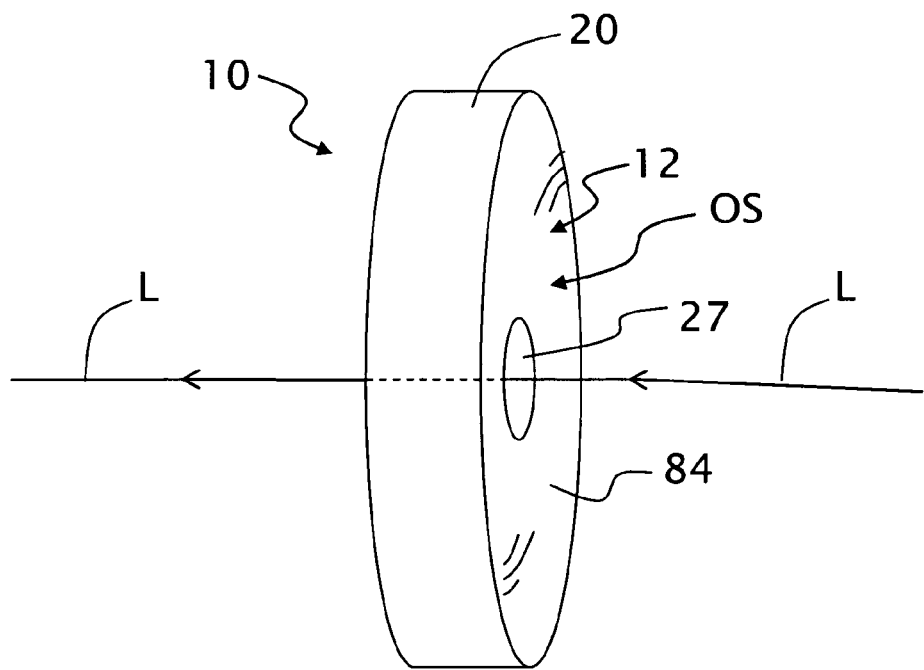
FIG. 17 is a perspective view of an example aerogel-based optical element in the form of a concave mirror with a central aperture.

FIG. 16 is an exploded perspective view of an example aerogel-based optical element 10 wherein aerogel member 20 includes an aperture 27 and glass sheets 40 on respective sides 22. Thus, light L can pass through element 10 by passing through glass sheets 40 as well as through aperture 27. In an example embodiment, glass sheets 40 include one or more select coatings 126 and aerogel member 40 has a select thickness $T_{20}$ so that element 10 of FIG. 16 constitutes a lightweight Fabry-Perot interferometer. Note that aperture 27 is useful when the wavelength of light is such that it will not readily pass through aerogel member 20 without scattering or attenuation. In example embodiments, wavelengths shorter than the aforementioned 5 μm are transmitted through aperture 27 rather than through the aerogel material itself.

Figure 18:
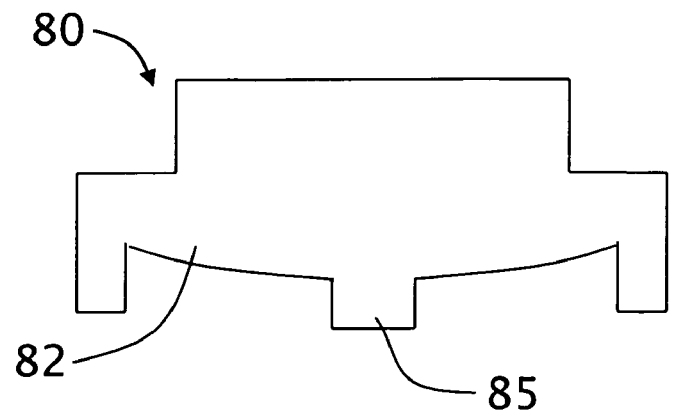
FIG. 18 is a schematic cross-sectional view of an example mandrel similar to that shown in FIG. 3 but that includes a central bump that forms a central aperture in the aerogel member.

FIG. 18 is a schematic cross-sectional view of an example mandrel 80 similar to that shown in FIG. 3 but that includes a central bump that forms a central aperture 27 in aerogel member 20. Other approaches in forming apertures in aerogel member 20 include cutting or drilling.

Figure 19:
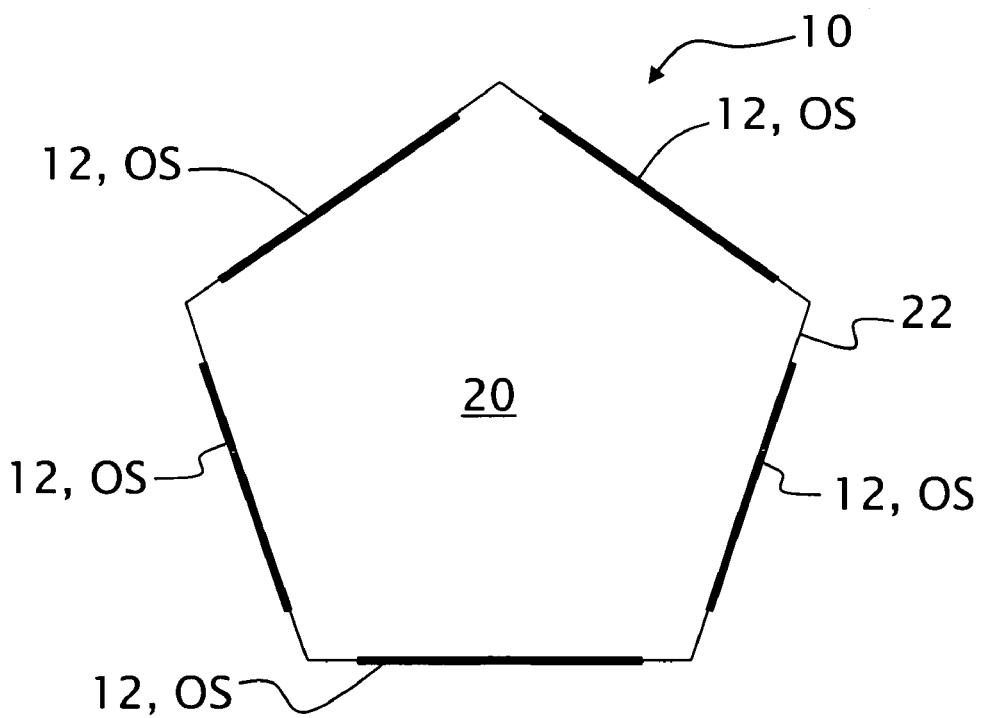
FIG. 19 is a an example aerogel-based optical element in the form of a pentagonal mirror.

FIG. 19 is a pentagonal aerogel-based mirror 10 that includes five mirror surfaces 12. Such a mirror can be used for optical scanning, and its light weight makes it easier to rotate (i.e., it takes less energy to rotate than heavier mirrors).

Figure 20A:
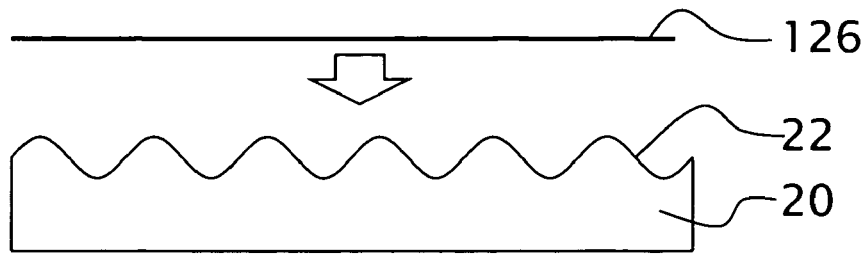
FIGS. 20A and 20B illustrate an example aerogel-based optical element in the form of a reflective grating.
Figure 20B:
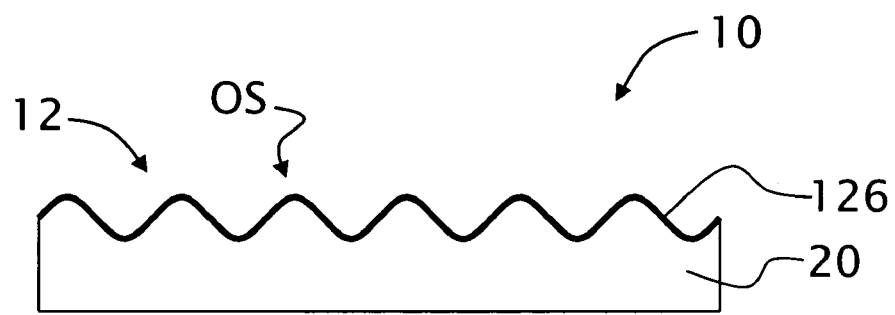
Figure 21:
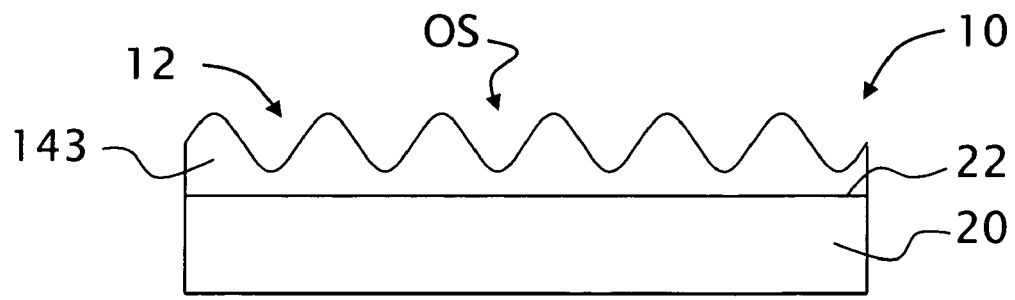
FIG. 21 is an example of an aerogel-based optical element in the form of a grating, wherein the grating is formed in a layer of material supported by the aerogel member.

FIGS. 20A and 20B illustrate an example aerogel-based optical element 10 in the form of a reflective grating. FIG. 20A shows aerogel member 20 having a grating surface 22, which can be formed by diamond turning, for example. One or more coatings 126 is/are applied to grating surface 22, and the resulting reflective grating element 10 is shown in FIG. 20B.

In another example embodiment, the grating surface 22 is applied as a microstructure to an intermediate material layer 143 such as an epoxy, plastic, thin glass layer, metal layer, etc., and the microstructured material layer 143 is fixed to the aerogel member 20, as shown in FIG. 20C. In an example embodiment, the microstructure is formed by stamping with a master or by standard lithographic or holographic processes used to form gratings and like microstructures.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An aerogel-based optical element, comprising:
    an aerogel member having first and second surfaces;
    first and second layers of fixing material respectively disposed on the first and second surfaces; and
    first and second sheets applied to the respective first and second layers of fixing material, wherein at least the first sheet is a glass sheet.
2. The optical element of claim 1, wherein the glass sheet has a thickness in the range from between 0.05 mm and 1 mm.
3. The optical element of claim 2, wherein the glass sheet has a coefficient of thermal expansion that is nearly identical to that of the aerogel member.
4. The optical element of claim 1, wherein the second sheet is made of a non-glass material.
5. The optical element of claim 1, wherein at least one of the first and second sheets is polished.
6. The optical element of claim 1, wherein the first and second sheets are substantially parallel to one another.
7. The optical element of claim 1, wherein at least one of the first and second sheets is curved.
8. The optical element of claim 1, wherein the aerogel member includes an aperture.
9. The optical element of claim 8, wherein the first and second sheets are glass sheets so that light can travel through the optical element via the first and second glass sheets and the aperture in the aerogel member.
10. The optical element of claim 8, wherein the second sheet is metal, and wherein the first and second sheets include respective first and second apertures aligned with the aperture in the aerogal member so that light can travel through the optical element through the first and second apertures and the aerogel member aperture.
11. A method of forming an optical element, comprising:
    providing an aerogel member having first and second surfaces;
    disposing first and second layers of fixing material on the first and second surfaces, respectively;
    disposing first and second sheets on the fixing material to fix the first and second sheet to the aerogel member first and second surfaces, wherein at least the first sheet is a first glass sheet.
12. The method of claim 11, including providing the aerogel member with an aperture and providing the second sheet as a second glass sheet.
13. The method of claim 11, including providing the second sheet as a metal sheet.
14. The method of claim 11, including forming at least one of the first and second surfaces as a curved surface.
15. The method of claim 11, including forming the at least one curved surface by either: a) diamond turning or b) impressing a master element into at least one of the first and second aerogel member surfaces.
16. The method of claim 11, wherein the first glass sheet has a thickness in the range from 0.05 mm to 1 mm.
17. The method of claim 11, including forming the aerogel member using a mold and release process.
18. The method of claim 11, further comprising applying a microstructure to at least one of the first and second aerogel member surfaces via either a replication process or a lithographic process.
19. The method of claim 18, further comprising forming the microstructure as a grating.
20. The method of claim 18, further comprising forming the microstructure in an intermediate material layer, and disposing the microstructured material layer on one of the first and second aerogel member surfaces.

* * * * *